2,904,439

YEAST EXTRACTION

Elmer J. Cooper, Milwaukee, and Henry J. Peppler, Whitefish Bay, Wis., assignors to Red Star Yeast and Products Company, Milwaukee, Wis., a corporation of Wisconsin No Drawing. Application January 25, 1956
Serial No. 561,349

6 Claims. (Cl. 99—97)

This invention relates to the extraction of living cells and has for an object the provision of an extraction process that is particularly adaptable to the treatment of living microbial cells, such as yeast, bacteria, molds and the like.

An important object of this invention is to provide a procedure in which an active dry yeast is subjected to extraction conditions controlled to obtain high yields of useful compounds that are normally present within the living cells. Thus by this procedure there has been devised a process in which trehalose is extracted in large quantities from living yeast cells. Other substances are likewise extracted, particularly those of comparatively low molecular weight, such as the various amino acids, vitamins, and certain enzymes that are known to be present in the protoplasmic material of yeast.

Another important object of this invention is the provision of a procedure of extracting yeast cells which is carried out in such a manner that a cellular residue comprising essentially cell walls is a by-product of the process. This cellular residue is very nutritious and has an extremely bland flavor which permits of its wide use in the incorporation of various types of food and feed products, as will be understood.

It has been proposed in the past to extract useful substances from cellular material such as yeast cells by thoroughly grinding the yeast and then extracting or washing it to separate the disintegrated cellular material. Such a procedure has not been satisfactory, however, because the grinding step results in the loss of considerable amount of cellular residue which may be a desired product and also it has been difficult to separate the intracellular material from the ground cellular material. In addition, certain of the desired enzymes that are contained within the intracellular material are denatured due to the fracturing of the protein prosthetic groups during the grinding step.

In addition it has been proposed to extract dead cells in order to separate the various constituents of the yeast. However, dead cells such as heat-killed cells are quite different in their chemical composition than living cells and it is impossible in many cases to separate the same desired fractions from dead cells as may be separated from living cells. In addition the residue obtained from the extraction of heat-killed cells has a high flavor which is not desired where the residue is to be incorporated into certain bland food products.

Accordingly, a further object of this invention is the provision of a process of extracting living cells such as yeast in order to obtain high yields of intracellular materials that are normally associated with said living cells.

A still further object of this invention is the provision of a process of extracting yeast cells to obtain high yields of extracted materials, the process being of such a nature that it does not depend upon mechanical disintegration, autolysis or hydrolytic decomposition prior to extraction.

A further object of this invention is the provision of a procedure for extracting living yeast cells whereby various types of intracellular material may be readily separated from the cellular residue for further purification and wherein the cellular residue resulting from the process has a bland flavor that permits of its ready use in many types of food and feed products.

Further and additional objects will appear from the following description and the appended claims.

In accordance with this invention a procedure has been devised for extracting the intracellular material from living microbial cells which comprises the steps or dehydrating the cells under such conditions that they remain viable and the cells are thereafter contacted with water or a water-containing solution which is initially at a temperature below 60° F. and preferably below 50° F. but above the freezing temperature. If an active dry yeast is treated by such a procedure, then it is possible to separate from the cellular material of the yeast more than 20% by weight of extracted solids. These solids appearing in solution comprise a large percentage of the intracellular material and include a number of desirable substances which may be separated from each other by well known methods, such substances including trehalose, amino acids, enzymes, coenzymes, certain vitamins, glutathione and the like. In carrying out the process of this invention, any type of microbial cellular material may be subjected to the extraction procedure, such as molds, bacteria, yeasts, algae, protozoa and the like. It will, of course, be understood that the different species of microorganisms will give rise to a large variety of different materials in the extracting solution. Thus in its broader aspects, the invention as herein disclosed is directed to a procedure of extracting living microbial cells generally in order to obtain a high percentage of the intracellular material that may be contained therein and, in its broad aspects, is not restricted to the particular type of substances extracted. In accordance with this invention, if a dry but still viable microbiological preparation is extracted with cold water as above indicated, then high yields of an extractant are possible, and in the case of yeast particularly, the cell residues are very bland and provide a useful by-product.

In the practice of this invention as applied to yeast, an active dry yeast which has a moisture content of between about 5 and 10 percent by weight of water is employed. Preferably the water content is between about 5.5 and 8.5 percent by weight. An active dry yeast having this moisture content is suspended in an aqueous solution which has an initial temperature below 60° F. and preferably below 50° F. and the resulting suspension is agitated for a short period of time whereby to leach the intracellular material from the yeast cells. Thereafter the cellular residue is separated from the extractive fluid by settling, centrifuging or otherwise and the extracting fluid may or may not be concentrated before separating the individual constituents such as trehalose therefrom. The cellular residue which is bland in flavor may or may not be dehydrated and then incorporated into a suitable food or food product.

For a more complete understanding of this invention, reference will now be made to a specific example. A sample of activated dry yeast was prepared by drying a mass of cells of *Saccharomyces cerevisiae* under controlled conditions of temperature and humidity. The dry product contained about 5.7 percent moisture by weight and a typical sample will usually contain between 15 and 20 billion live cells per gram of material. One hundred parts by weight of the active dried yeast were treated with 500 parts by weight of distilled water at 39° F. and the suspension was mechanically stirred for about 30 minutes. It was thereafter centrifuged at 2300 r.p.m. in a Universal refrigerated centrifuge at 40° F. The supernatant liquor contained 13.6 parts (91% of the total) trehalose of which about 10 parts were isolated by the method of Stewart et al., J.A.C.S. 72:2059 (1950). The yield as anhydrous trehalose was 69.3 percent. The centrifuge residue was diluted to provide a cream of 16 percent solid content and drum-dried. The resultant product was light colored, reduced in flavor, low in ash and high in protein and nucleic acid in comparison with the original composition of the viable dry yeast.

It is not fully understood why rehydration of the dried microbial cells with cold water permits such a high amount of material to be extracted from the cells. However, it is postulated that the rehydration with cold water so alters the permeability of the cells that the water-soluble constituents of relatively low molecular weights are extracted. A selective permeability seems to be retained by the intact cells thereby inhibiting the movement of the larger molecules and thus preventing their removal during the extraction process. Thus the nitrogen found in the water extract comprises to a large degree free amino acids of which many have been identified. Other factors identified in the extract are thiamin, riboflavin, niacin, glutathione, inositol and DPN (diphosphopyridine nucleotide).

As indicated, the extracting liquid used in accordance with this invention is cold water. It will be apparent that the cold water may be buffered or adjusted to the acid or alkaline condition if desired. Thus extracting water buffered to the alkaline side is used to facilitate the extraction of certain substances such as DPNH (reduced diphosphopyridine nucleotide).

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

We claim:

1. An essentially nonautolytic process for treating and extraction of active dry yeast which comprises extracting whole cells of a viable active dry yeast having a moisture content of less than 10% by agitating said active dry yeast with water at a temperature below about 60° F. for a period of up to about thirty minutes thereby to extract water soluble intracellular material contained in said yeast cells in an amount equal to at least about 20% by weight of said dry yeast, and recovering said aqueous extract from the residual cellular yeast product.

2. An essentially nonautolytic process for extraction of trehalose from active dry yeast which comprises extracting whole cells of a viable active dry yeast having a moisture content of less than 10% by agitating with water at a temperature below about 60° F. for a period of up to about thirty minutes to extract trehalose as a water soluble intracellular extract from said yeast cells, and recovering said aqueous extract from the residual cellular yeast product.

3. An essentially nonautolytic process for the treating and extraction of the intracellular contents of active dry yeast which comprises extracting whole cells of a viable, active dry yeast having a moisture content of from about 5 to about 10% by weight thereof by agitating said active dry yeast with water at a temperature below about 60° F. for a period of up to about thirty minutes to thereby extract the water soluble intracellular material contained in said cells in an amount equal to at least about 20% by weight of said dry yeast, and thereafter recovering said aqueous extract from the residual cellular yeast product.

4. The process of claim 3 wherein the aqueous extract is recovered from the residual cellular yeast product by centrifugation.

5. An essentially nonautolytic process for the treating and extraction of the intracellular contents of active dry yeast which comprises extracting whole cells of a viable, active dry yeast having a moisture content of from about 5.5 to about 8.5% by weight thereof by agitating said active dry yeast with water at a temperature below about 60° F., for a period of up to about thirty minutes to thereby extract the water soluble intracellular material contained in said cells in an amount equal to at least about 20% by weight of said dry yeast, and thereafter recovering said aqueous extract from the residual cellular yeast product.

6. The process of claim 5 wheerin the extraction step is carried out at a temperature below about 50° F.

References Cited in the file of this patent

UNITED STATES PATENTS

| | | |
|---|---|---|
| 648,468 | Ruckforth | May 1, 1900 |
| 652,910 | Peeters | July 3, 1900 |
| 785,733 | Hess | Mar. 28, 1905 |
| 785,734 | Hess | Mar. 28, 1905 |
| 1,012,147 | Nolf | Dec. 19, 1911 |
| 2,141,455 | Weizmann | Dec. 27, 1938 |

OTHER REFERENCES

"Bacterial Chemistry and Physiology," by J. R. Porter, 1946, publ. by John Wiley & Sons, Inc. (New York), pp. 8 to 10, 201 and 202.

"Basic Bacteriology," 1953, by Lamanna and Mallette, publ. by The Williams & Wilkins Co. (Baltimore), pp. 207 to 210.